Sept. 25, 1962   N. KARWATT ET AL   3,055,674
AXLE AND WHEELED ATTACHMENT FOR METAL GARBAGE CANS
Filed Nov. 16, 1960
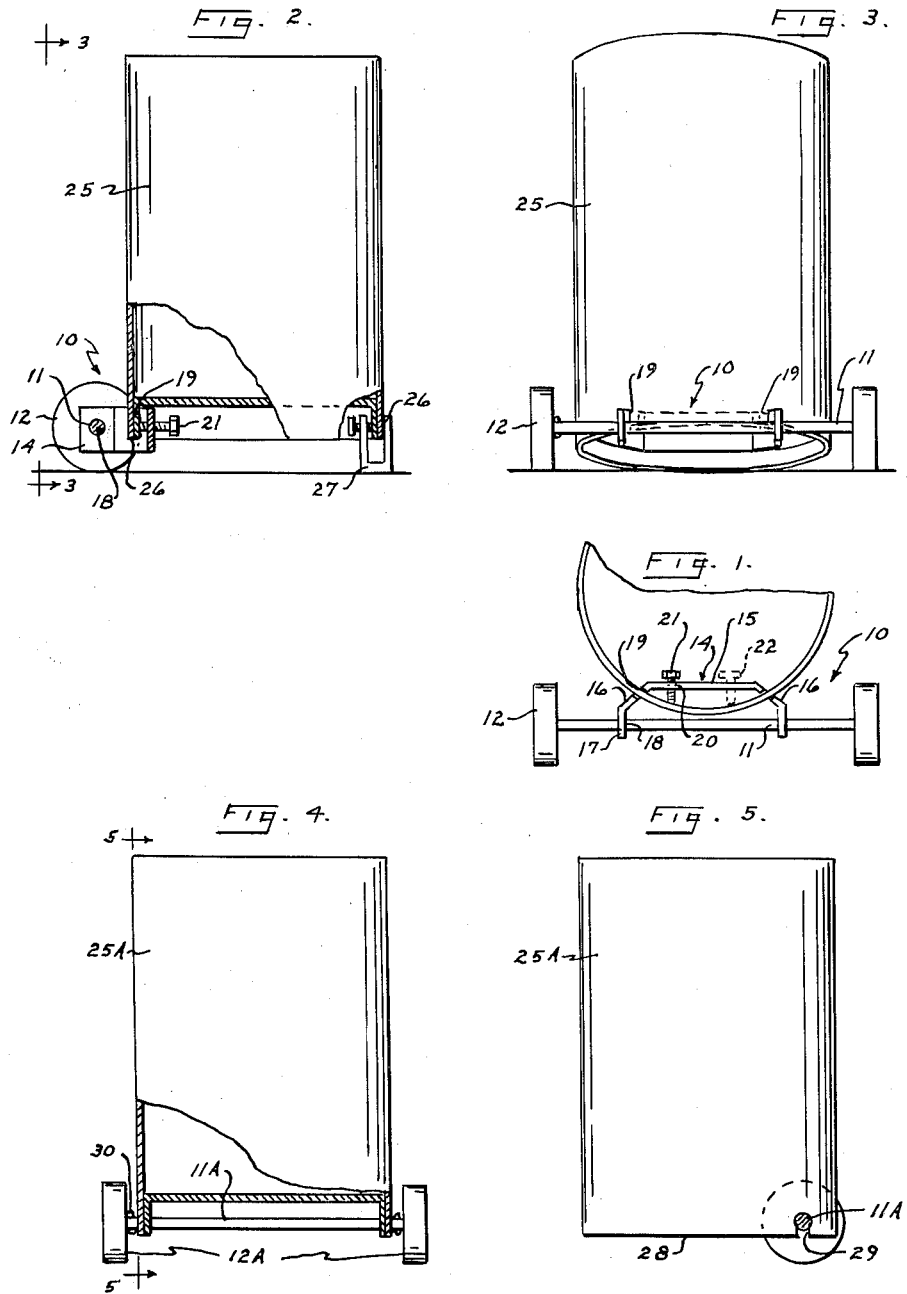
INVENTORS
ALVIN KARWATT
NINA KARWATT
BY
*Howard J. Jeandron*
AGENT

United States Patent Office 3,055,674
Patented Sept. 25, 1962

3,055,674
AXLE AND WHEELED ATTACHMENT FOR
METAL GARBAGE CANS
Nina Karwatt and Alvin Karwatt, both of
392 Washington Road, Sayreville, N.J.
Filed Nov. 16, 1960, Ser. No. 69,740
1 Claim. (Cl. 280—47.13)

This invention relates to an attachment for garbage cans and more particularly to an axle and wheels that may be quickly and easily attached to the bottom rim of a garbage can, so that the can may be tipped to bear upon the wheels and be easily rolled as desired for disposal.

There are many wheeled dollies used for transporting garbage cans, and the prior art illustrates dolly attachments; such as, Patent No. 2,919,138, showing a dolly attachment for a suitcase, where the attachment is permanently mounted to the corner of the suitcase.

It is an object of this invention to provide an axle and wheels that may be easily affixed to the bottom rim of a garbage can, so that the garbage can may be easily tipped to bear upon the axle and wheels and be rolled to a desired position for garbage disposal.

A further object of this invention is to provide a temporary axle and wheeled attachment for a garbage can to convert the garbage can into an easily rollable garbage disposal unit.

A still further object of this invention is to provide a slotted metal bar supported on an axle and wheels in which the slots are so positioned that the bottom rim of a garbage can may be fitted into the slots and locked in this position to provide an easily rollable garbage disposal unit.

Various objects of this invention shall be apparent by reference to the accompanying detailed description and the drawings in which:

FIG. 1 illustrates a plan view of the device,

FIG. 2 illustrates a side elevational view partly in cross section with the device attached to a garbage can, FIG. 3 illustrates a front elevational view taken on line 3—3 of FIG. 2.

FIG. 4 illustrates a front elevational view partly in cross section of a further embodiment of this device, and FIG. 5 is a side elevational view taken on line 5—5 of FIG. 4.

Referring to the drawings and particularly to FIG. 1, there is illustrated an axle and wheeled attachment 10 for metal garbage cans, comprised of an axle 11 with a pair of wheels 12, and a metal frame 14. The metal frame 14 may be a piece of ordinary flat stock bent in the configuration of a wide U. To be more exact, the base of the U is a flat length 15 and each end 16 is bent outward at an angle from the back 15 and further bent so that the ends 17 are at right angles to the back 15. The end portions 17 are provided with an aperture 18 so that the axle 11 may be passed through both apertures 18 and the wheels 12 mounted at each end of the axle. The wheels 12 may be mounted in any standard manner to retain their position at the end of the axle, while being freely rotatable on the axle. The axle 11 may also be rotatable in the apertures 18. The portions 16 of the metal frame 14 are provided with a slot 19, while the back portion 15 is provided with a threaded aperture 20 to receive a bolt 21.

It is also permissible to provide an additional aperture 22 for a second bolt 21. The device as illustrated in FIG. 1 and as described is easily attached to a standard metal garbage can to thus make the garbage can a rollable easily transported garbage disposal element.

Referring to FIG. 2, there is illustrated the device axle and wheeled attachment 10 affixed to a garbage can 25. The lower rim 26 of the garbage can fits into both slots 19 (as shown in FIG. 1) and the bolt 21 may be turned to clamp the rim 26 in a tight gripping relationship, thus as illustrated in FIG. 3, the garbage can will rest in a slightly tipped position with this wheeled attachment. However, a further embodiment of the invention is to provide a leg or strut 27 that may be attached to the front edge of the garbage can and since the leg 27 is of a predetermined length to match the size of the wheels 12, it will retain the garbage can 25 in the level position as illustrated in FIG. 2.

Referring to FIGS. 4 and 5 there is illustrated a garbage can 25A. The bottom rim 28 is provided with two slots 29. It is to be noted that slots 29 are formed so that an axle 11A may be forced upward in the slots 29, but the axle in its seated position at the upper end of the slot will be freely rotatable in the slot. Referring to axle 11A it is formed with a die to provide a slightly raised portion 30 situated outside of the slots 29. This prevents the axle 11A from moving to the right or left in use. A pair of wheels 12A are mounted at each end of the axle and are similarly retained in a desired position with the same die to provide dog-ears on each side of the wheels yet allowing the wheels to be freely rotatable on the axle. It is to be noted that slot 29 must be positioned as close to one side of the garbage can as is feasible so that the garbage can may be tipped to bear on the pair of wheels without the edge of the garbage can hitting the ground and thus provide an easily rolled portable device.

It is to be noted that although this invention is primarily designed for a pair of wheels to be mounted to a garbage can, it may be attached to any barrel or container formed with a lower rim and although the attachment as described is provided with a pair of very small wheels having a fairly broad traction, the wheels may be changed in size or width or in texture from a solid to a pneumatic wheel without departing from the spirit of this invention and this invention shall be limited only by the appended claim.

What is claimed is:

A wheeled attachment for a garbage can or barrel which includes a frame formed with a straight back and each end bent outwardly with one portion at 45° to the base and a second portion at 90° to the base and provided with an axle extending through both ends of the frame and a pair of wheels mounted at each end of the axle and in which the frame is provided with a pair of slots in the 45° portion in a predetermined position with relation to each other to receive the rim of a garbage can and a threaded bolt mounted in the base of the frame to provide the means of securing the attachment in a fixed relation to the lower rim of the garbage can.

References Cited in the file of this patent
UNITED STATES PATENTS
2,953,387    Portner _____ Sept. 20, 1960